Sept. 13, 1932.  C. C. MINOR  1,877,355
OBJECTIVE
Filed Nov. 19, 1928
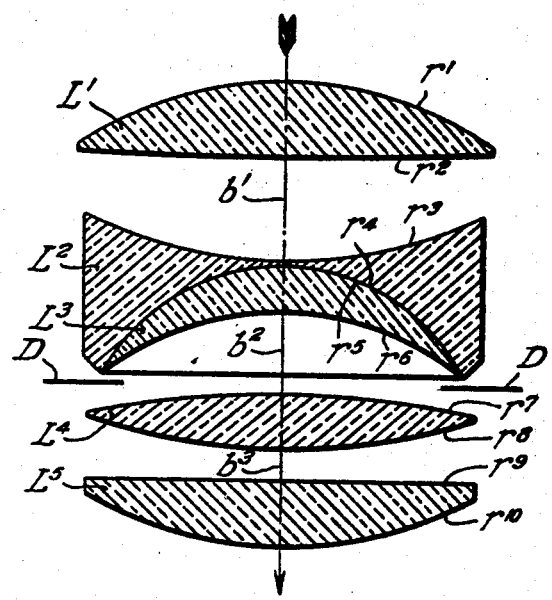
Focal length 40mm   Clear Aperture 25.6mm
| | | | |
|---|---|---|---|
| $r_1$ = 23.4 | | $L^1$ d = | 4.64 |
| $r_2$ = 296.0 | | $b^1$ = | 6.70 |
| $r_3$ = 29.2 | | $L^2$ d = | 0.10 |
| $r_4$ = 12.8 | | $L^3$ d = | 2.69 |
| $r_5$ = 12.8 | | $b^2$ = | 5.30 |
| $r_6$ = 19.6 | | $L^4$ d = | 3.40 |
| $r_7$ = 61.0 | | $b^3$ = | 2.05 |
| $r_8$ = 39.9 | | $L^5$ d = | 4.12 |
| $r_9$ = ∞ | | | |
| $r_{10}$ = 25.5 | | Overall = | 29.00 |
| | Refraction $r_D$ | Dispersion V | Diameter |
|---|---|---|---|
| $L^1$ | 1.61 | 57 | 26.3 |
| $L^2$ | 1.623 | 36 | 25.0 |
| $L^3$ | 1.61 | 57 | 23.0 |
| $L^4$ | 1.61 | 57 | 24.5 |
| $L^5$ | 1.61 | 57 | 24.5 |
Inventor
Charles Clayton Minor
By Emery, Booth, Janney - Varney
Attys.

Patented Sept. 13, 1932

1,877,355

UNITED STATES PATENT OFFICE

CHARLES CLAYTON MINOR, OF HOLLYWOOD, CALIFORNIA

OBJECTIVE

Application filed November 19, 1928. Serial No. 320,251.

My invention relates to optics and more particularly to an improved photographic objective useful primarily in the taking of pictures under such extreme conditions as frequently obtain in motion picture work.

In this general type of objective it has in the past been customary to secure, by compromise, an approximate correction for the spherical aberration, and an approximate achromatism; by the use of a single lens of negative form of relatively high refraction and dispersion, combined with a plurality of lenses of positive form. As a rule such an objective has greater defects as to achromatism than as to spherical aberration.

A negative lens securing substantially perfect correction for the spherical aberration compensates for achromatism very poorly so that the necessity for compromise is at once apparent.

Referring to the accompanying drawing, I have illustrated an objective made up of five lenses, L1, L2, L3, L4, L5, lenses L2 and L3 constituting a cemented doublet. These lenses have the radii $r1$ and $r2$ for L1, $r3$ and $r4$ for L2, $r5$ and $r6$ for L3, $r7$ and $r8$ for L4, $r9$ and $r10$ for L5. The diaphragm is located between L3 and L4, as indicated at D.

One illustrative example of the type of objective indicated in the drawing is as follows:

*Formula for 40 mm lens F 1.4*
*Clear aperture 25.6 mm*

Lens #1 — $r1 = 23.4$, $r2 = 296.0$, $d = 4.64$ mm
 $b1 = 6.70$
Lens #2 — $r3 = 29.2$, $r4 = 12.8$, $d = 0.10$ mm
Lens #3 — $r5 = 12.8$, $r6 = 19.6$, $d = 2.69$ mm
 $b2 = 5.30$
Lens #4 — $r7 = 61.0$, $r8 = 39.9$, $d = 3.40$ mm
 $b3 = 2.05$
Lens #5 — $r9 = \infty$, $r10 = 25.5$, $d = 4.12$ mm

|  | Refraction | Dispersion | Diameter |
|---|---|---|---|
| Lens #1 | $nD$ 1.61 | $v$ 57 | 26.3 mm |
| Lens #2 | $nD$ 1.623 | $v$ 36 | 25.0 mm |
| Lens #3 | $nD$ 1.61 | $v$ 57 | 23.0 mm |
| Lens #4 | $nD$ 1.61 | $v$ 57 | 24.5 mm |
| Lens #5 | $nD$ 1.61 | $v$ 57 | 24.5 mm |

Overall length = 29 mm

In the foregoing table, $d$ indicates the dimensions of each lens along the axis of the objective as a whole, and $b$ indicates the air space between adjacent lenses measured along the same axis. The dispersions given in the foregoing table have been calculated from the following formula:

$$\frac{n^D - 1}{n^F - n^C} = v$$

The construction disclosed affords two different properties in the objective lens capable of quasi-independent variation by the selection of different glasses and different curvatures. One of these may be employed primarily to secure correction for spherical aberration, and the other primarily for achromatism. Thus in the example submitted the curvatures and optical properties of L2 were selected primarily for correcting the spherical aberration, and achromatism was then completed by the selection of the shape and optical properties of L3. Of course, the final solution involves the effect of both L2 and L3 on both chromatic and spherical aberration. I find that this not only enables me to get a better overall achromatism, but that secondary spectrum errors due to the anomalous dispersion of the various glasses used are also materially reduced by the new system of correction.

Considered in terms of dispersion the objective is a combination of one negative flint with four positive crowns, since the lens L3 is, by itself, of positive form. However, considered from the point of view of refraction, it is a four lens combination.

Without further elaboration the foregoing will so fully explain the gist of my invention, that others may, by applying current knowledge, readily adapt the same for use under various conditions of service.

I claim:

1. A photographic objective comprising, in combination, four positive lenses of crown glass, all having the same index of refraction and identical dispersion, a negative lens of flint glass having an index of refraction substantially as low as the crown glass and dispersion materially higher than the crown glass, the lenses being arranged as follows: First, a double convex crown receiving the incident rays; second, a double concave flint; third, a concavo-convex crown fitted into the flint and cemented thereto; fourth, a double convex crown; and fifth, a plano-convex crown, and a diaphragm between the third and fourth lenses.

2. A photographic objective of an aperture greater than half the focal length comprising, three simple positive lenses and one negative doublet, the indices of refraction of the lenses in the doublet being substantially the same, one of the positive lenses being in front of the doublet and the other two behind, and a diaphragm just back of the doublet, the light passing the diaphragm being strongly divergent, the total axial length of the objective being substantially equal to the diameter of the front lens, the axial dimension from the rearmost portion of the doublet to the rear of the objective being less than half the diameter of the rear lenses.

3. A photographic objective comprising, three positive lenses and one negative doublet, the indices of refraction of the lenses in the doublet being substantially the same, one of the positive lenses being in front of the doublet and the other two behind, the axial dimension from the rearmost portion of the doublet to the rear of the objective being less than half the diameter of the rear lens.

4. A photographic objective comprising, three positive lenses and one negative doublet, and a diaphragm just back of the doublet, the axial dimension from the rearmost portion of the doublet to the rear of the objective being less than half the diameter of the rear lens.

5. A photographic objective comprising, in combination, four positive lenses, all having substantially the same refraction and dispersion, a negative lens having refraction substantially the same as the positive lenses, but materially higher dispersion, the lenses being arranged as follows: First, a positive lens receiving the incident rays; second, the negative lens; third, a positive lens fitting the negative lens to form a doublet; and fourth and fifth, two more positive lenses spaced from each other and from the doublet.

In testimony whereof, I have signed my name to this specification.

CHARLES CLAYTON MINOR.